UNITED STATES PATENT OFFICE.

JAMES TAYLOR CARRICK, LATE OF JOHANNESBURG, TRANSVAAL, DECEASED; ELLIOT ST. MAURICE HUTCHINSON AND ROBERT GOW RALSTON, EXECUTORS.

PROCESS FOR BLACKENING BROWNED FERRO-FERRIC HYDRATE.

984,075. Specification of Letters Patent. Patented Feb. 14, 1911.

No Drawing. Application filed June 11, 1910. Serial No. 566,435.

*To all whom it may concern:*

Be it known that JAMES TAYLOR CARRICK, who was a British subject, and resident of Johannesburg, Transvaal, but is now deceased, did invent certain new and useful Improvements Relating to Processes for Blackening Browned Ferro-Ferric Hydrate, of which the following is a specification.

The present invention has reference to the blue black magnetic iron hydrate, which is employed principally as a pigment and which is prepared by various processes from waste pickle liquors and other ferrous solutions. Although its precise composition is believed to be undetermined and is apparently somewhat variable it may for the purpose of the present invention be referred to as ferro-ferric hydrate. This hydrate, either during or after its preparation, is liable to oxidize and assume a brown tinge, and it is the purpose of the present invention to provide a method of restoring such oxidized pigment to its original dense black color.

According to the present invention, the browned oxid is heated with any convenient oil or oleaginous matter, within the limits of temperature hereafter referred to. The following substances typical of animal vegetable and mineral oils and greases have been experimented with, viz: Butter, lard, cod liver oil, sperm oil. Linseed oil, raw; linseed oil, boiled; olive oil, cotton seed oil, palm oil, colza oil, cocoanut oil, almond oil, castor oil. Paraffin, solid, vaseline. All the above have given results, the only observable difference being a slight variation in the speed of reaction. It may be remarked that cotton seed oil appeared to give the most rapid result, so far as any variation was observable.

While it is recognized that the definition "oil or oleaginous matter" is from a scientific point of view, somewhat indefinite, the wide range of reacting substances evidenced by the uniform success of the above instances, selected as they were to a large extent fortuitously, seems to indicate that no scientifically exact definition is possible. It is thought nevertheless that the broad general characteristics predicated by the definition taken in conjunction with the specific examples, will clearly indicate to others the ambit of the invention; and the latter may further be limited by stating that substances not fairly coming under the definition, although chemically somewhat analogous to certain of the examples given, are either useless or give inferior results. Thus carbolic acid produced a distinctly poor effect, while naphthalene proved entirely ineffective.

With regard to the temperature at which the reaction should be carried out, the lowest useful limit may be set about 150° C., but on the other hand the temperature employed is always less than that at which any substantial alteration of the oil or oleaginous matter occurs and in particular is insufficient to prevent carbonization of the same. The best results were obtained by heating the oil or oleaginous matter to between 200° and 300° C. and dropping the brown hydrate into it. In such instances the reaction was practically instantaneous and was accompanied by a considerable rise in temperature.

The re-blackened hydrate may be extracted from the oil or oleaginous matter by dissolving the latter in a suitable volatile solvent, decanting or filtering the mixture, and evaporating the residue of the solvent. On the other hand, when paint or the like is being made, the browned hydrate may be heated in linseed or other oil suitable for paint making; the mixture after blackening has taken place, being treated in the usual manner for the manufacture of paint.

Having now described our invention what we claim as new and desire to secure by Letters Patent is:—

1. A process for blackening browned ferro-ferric hydrate which consists in heating the hydrate with oleaginous matter at a temperature less than that at which any substantial alteration of the oleaginous matter occurs.

2. A process for blackening browned ferro-ferric hydrate which consists in heating the hydrate with cotton seed oil at a temperature less than that at which any substantial alteration of the said oil occurs.

3. A process for blackening browned ferro-ferric hydrate which consists in heating oleaginous matter to a temperature between the limits of 200° C. and 300° C. and in then dropping the browned hydrate into said heated oleaginous matter.

4. A process for obtaining blackened ferro-ferric hydrate which consists in heating the browned hydrate with oleaginous matter at a temperature less than that at which any substantial alteration of the oleaginous matter occurs, dissolving the oleaginous matter in a volatile solvent separating the solid from the liquid, and evaporating the residual solvent.

5. A process for obtaining blackened ferroferric hydrate which consists in heating the browned hydrate with cotton seed oil at a temperature less than that at which any substantial alteration of said oil occurs, dissolving the oil in a volatile solvent, separating the solid from the liquid, and evaporating the residual solvent.

6. A process for obtaining blackened ferro-ferric hydrate which consists in heating oleaginous matter to a temperature between the limits of 200° C. and 300° C., dropping the browned hydrate into said heated oleaginous matter, dissolving the oleaginous matter in a volatile solvent, separating the solid from the liquid, and evaporating the residual solvent.

In testimony whereof we have affixed our signatures in the presence of two subscribing witnesses.

ELLIOT ST. MAURICE HUTCHINSON,
ROBERT GOW RALSTON,
*Executors of James Taylor Carrick, deceased.*

Witnesses:
ALFRED L. SPOOR,
BERNARD PULLIN.